[47.]
Wᴹ F Goodwin,
Harvester.
No. 118,526. Fig. 1. Patented Aug. 29, 1871.
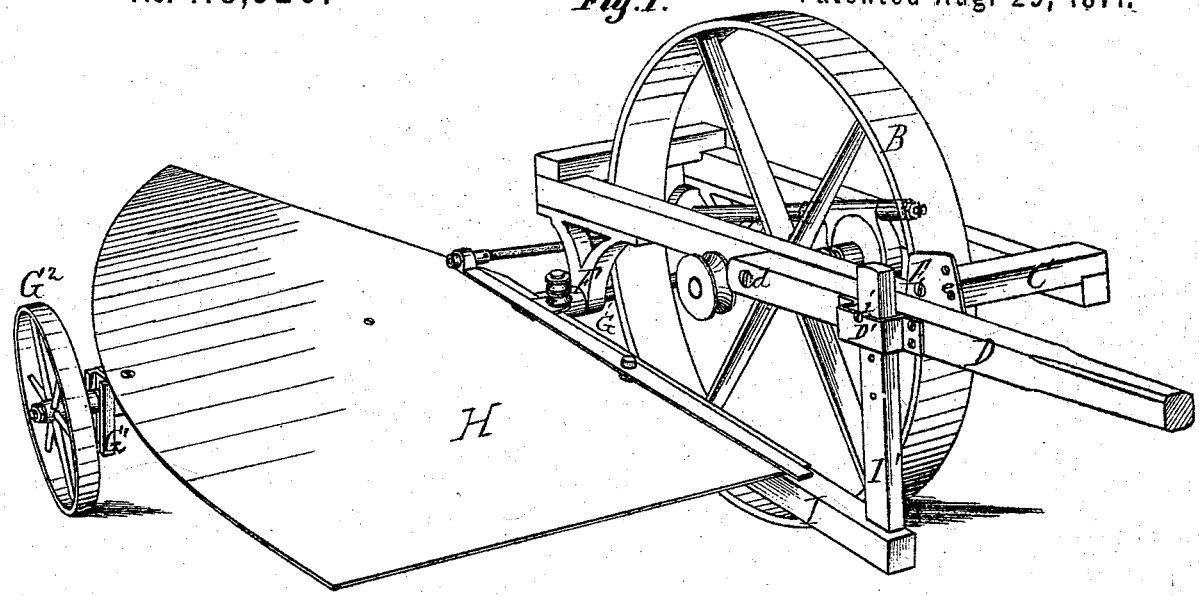
Fig. 2.
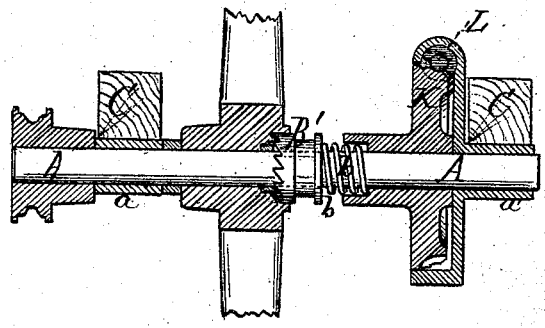
Fig. 3
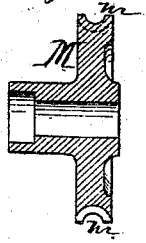
Witnesses.
N. H. Doubleday
N. B. Smith
Inventor.
Wm F. Goodwin
by his Attorney
A. M. Smith 118,526

UNITED STATES PATENT OFFICE.

WILLIAM F. GOODWIN, OF METUCHEN, NEW JERSEY.

IMPROVEMENT IN HARVESTERS.

Specification forming part of Letters Patent No. 118,526, dated August 29, 1871.

*To all whom it may concern:*

Be it known that I, WILLIAM F. GOODWIN, of Metuchen, county of Middlesex, State of New Jersey, have invented certain new and useful Improvements in Harvesting-Machines, of which the following is a full, clear, and exact description, reference being had to the accompanying drawing making part of this specification, in which—

Figure 1 is a perspective view of a machine embracing my improvements. Fig. 2 is a transverse vertical section through the bevel worm-wheel and its casing, and Fig. 3 is a sectional view of a worm-wheel of the ordinary construction.

Similar letters of reference wherever used indicate the same parts.

My invention relates to a novel arrangement of the hinged vibrating cutter and platform-frame, in combination with the main frame and hinged pole or tongue, whereby the height of the cutting apparatus which is connected with said vibrating-frame, may be varied without changing the angle of the cutter-frame and platform to the ground, when desired, as hereinafter set forth.

In the accompanying drawing, A represents the main drive-wheel axle; B, the driving-wheel; C, the main frame, made in rectangular or other suitable form, and provided at $a$ $a'$ with bearings in which the axle A is mounted. D is the pole or tongue, pivoted at its rear end to the main frame at $d$. E is a sector-plate, attached to the frame C in advance of the pivot $d$, and provided with a series of perforations, $e$, arranged in the arc of a circle of which pivot $d$ is the center, by means of which and a pin or bolt passing through the tongue and any one of said perforations $e$ the angle of relation of the tongue and main frame may be adjusted as desired. F F are hangers or pendent brackets attached to the rear end of frame C, and perforated at their lower ends to afford bearings or supports for a transverse rock-shaft or rod, G, which projects laterally from the frame C and affords a pivotal support, on which, as a center, the cutter-frame and platform H vibrate. The rod or shaft G, either directly or through a platform-bar, extends in a right line, or nearly so, to the outer or grain side of the platform H, and is provided at its outer end with a bracket or standard, $G^1$, having a vertical dovetail groove, in which an adjustable block of corresponding form on the inner end of the axle of the outer carrying or grain-wheel $G^2$ works, for adjusting said wheel as desired. To the rod G or platform-bar, at or near the inner side of the main frame, is attached the rear end of a vibrating drag or brace-bar, I, to the forward end of which the cutting apparatus and shoe may be connected in any usual manner. I' is a standard attached to the forward end of brace-bar I, and passing, at its upper end, through a loop or guide-bracket, D', secured to the pole D. The standard I' may be perforated, and, by means of a pin, $i$, passing through the same, may be made to hold the forward end of the drag-bar I and the cutting apparatus connected therewith at any desired height; or the usual lifting-lever and holding-pawl and rack may be used in connection therewith, leaving the standard to act simply as a guide to and to steady the connection of the brace-bar and cutting apparatus with the frame. When the height of the cutting apparatus and forward edge of the platform is thus raised or lowered the rear end of the platform may be correspondingly raised or lowered by the adjustment of the angle of relation of the tongue and main frame in the manner above explained, and the same angle of relation of the platform to the ground can thereby be maintained under different heights of cut; or, when desired, either adjustment may be made independently of the other, for passing obstructions or for other purpose. The driving-wheel B is mounted loosely on the axle A, and is connected therewith in the forward movement of the machine by a backing-clutch, B', feathered on shaft A and held up by a spring, $b$. K is a bevel worm-wheel keyed to and rotating with axle A, and L is a worm or screw-shaft, the screw of which engages with and receives motion from the worm-wheel K. The screw on shaft L is of the usual construction, and the shaft may be mounted in any desired manner. The wheel K is, however, materially different from the ordinary worm-wheel. Thus, the form heretofore in use in this class of wheels is that shown in Fig. 3, in which the teeth $m$ extend across the peripherical face of the wheel M, on a line substantially at right angles to the vertical face of the wheel, the ends of the teeth being made in the arc of a circle, as shown in Fig. 3, and conforming pretty nearly to the periphery of the screw. Of course this form entirely precludes casting the wheel by the ordinary methods of casting cogged gearing, from the fact that the ends of the circular faced teeth $m$ are longer and project further from the center of the wheel than their central portions. For this reason the pattern cannot be "drawn" from the sand, even though pitch of the working-faces of the teeth be compensated for by a corresponding bevel of the opposite side, so as to give them the required draft. But in my improved wheel, instead of forming my teeth on a base-line which is at right angles with the vertical face of the wheel—that is, on a line parallel with the axis of rotation of the wheel—I make my wheel to resemble, so far as the arrangement of its teeth is concerned, a bevel-gear wheel; in fact, I usually call my wheel a "bevel worm-wheel," and it will be seen that by this construction I can draw the pattern, thus enabling the molder to dispense with the use of "cores" in casting them, and materially reducing the cost of their manufacture. It may sometimes be necessary to use a wheel the teeth of which have so much "pitch" that it will be impossible to give the pattern a direct draft, but, from the fact that the position of the teeth obviates the difficulties incident to their concave shape, a little care will enable the molder to draw them, by backing them out, as but a slight deflection from a vertical line will ever be required.

Having now described my invention, what I claim as new, and desire to secure by Letters Patent, is—

The pivoted vibrating platform and cutter-frame, in combination with the adjustable main frame and hinged adjustable pole or tongue, all arranged and operating as described.

WM. F. GOODWIN.

Witnesses:
   NEWMAN A. WOOD,
   CALVIN P. LADD.